US010625506B2

(12) United States Patent
Asai et al.

(10) Patent No.: US 10,625,506 B2
(45) Date of Patent: Apr. 21, 2020

(54) METHOD FOR MANUFACTURING LIQUID DISCHARGE HEAD

(71) Applicant: CANON KABUSHIKI KAISHA, Tokyo (JP)

(72) Inventors: Kazuhiro Asai, Kawasaki (JP); Kenji Fujii, Yokohama (JP); Keiji Matsumoto, Fukushima (JP); Koji Sasaki, Nagareyama (JP); Kunihito Uohashi, Yokohama (JP); Jun Yamamuro, Yokohama (JP); Seiichiro Yaginuma, Kawasaki (JP); Masahisa Watanabe, Yokohama (JP); Ryotaro Murakami, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 117 days.

(21) Appl. No.: 15/890,162

(22) Filed: Feb. 6, 2018

(65) Prior Publication Data

US 2018/0154637 A1 Jun. 7, 2018

Related U.S. Application Data

(63) Continuation of application No. 14/553,978, filed on Nov. 25, 2014, now Pat. No. 9,919,526.

(30) Foreign Application Priority Data

Nov. 29, 2013 (JP) .................................. 2013-248449
Nov. 29, 2013 (JP) .................................. 2013-248450

(51) Int. Cl.
B32B 43/00 (2006.01)
B41J 2/16 (2006.01)
(Continued)

(52) U.S. Cl.
CPC ......... *B41J 2/1623* (2013.01); *B41J 2/14145* (2013.01); *B41J 2/1603* (2013.01);
(Continued)

(58) Field of Classification Search
CPC ....... B32B 38/10; B32B 43/006; B32B 37/12; Y10T 156/1168; Y10T 156/1195;
(Continued)

(56) References Cited

U.S. PATENT DOCUMENTS 6,143,190 A * 11/2000 Yagi ........................ B41J 2/1603
216/27
6,461,798 B1 * 10/2002 Ohkuma ................. B41J 2/1603
216/27
(Continued)

FOREIGN PATENT DOCUMENTS

JP 1994212102 A * 12/1994

OTHER PUBLICATIONS

Translation of JP08-54732A (Year: 1994).*

*Primary Examiner* — Mark A Osele
*Assistant Examiner* — Nickolas R Harm
(74) *Attorney, Agent, or Firm* — Canon U.S.A., Inc. I.P. Division

(57) ABSTRACT

A method for manufacturing a liquid discharge head includes a transferring step of transferring a dry film supported by a supporting member to a substrate having a hole, and a peeling step of peeling the supporting member off the dry film on the substrate. In the peeling step, the dry film is in contact with a wall surface defining the hole in the substrate.

20 Claims, 7 Drawing Sheets

(51) Int. Cl.
*B41J 2/14* (2006.01)
*B29C 65/00* (2006.01)
*B32B 38/10* (2006.01)
*B29C 65/74* (2006.01)
*B29C 65/40* (2006.01)
*B29C 65/48* (2006.01)
*B32B 37/12* (2006.01)
*B29C 65/02* (2006.01)

(52) U.S. Cl.
CPC ........... *B41J 2/1626* (2013.01); *B41J 2/1628* (2013.01); *B41J 2/1629* (2013.01); *B41J 2/1631* (2013.01); *B41J 2/1645* (2013.01); *B29C 65/02* (2013.01); *B29C 65/405* (2013.01); *B29C 65/48* (2013.01); *B29C 65/74* (2013.01); *B29C 66/472* (2013.01); *B29C 66/4724* (2013.01); *B32B 37/12* (2013.01); *B32B 38/10* (2013.01); *B32B 43/006* (2013.01); *Y10T 156/1168* (2015.01); *Y10T 156/1195* (2015.01); *Y10T 156/1994* (2015.01)

(58) Field of Classification Search
CPC . Y10T 156/1994; B29C 65/02; B29C 65/405; B29C 65/48; B29C 65/74; B29C 66/472; B29C 66/4724
USPC ................ 156/714, 719, 767, 230, 247, 297
See application file for complete search history.

(56) References Cited

U.S. PATENT DOCUMENTS

2007/0120889 A1* 5/2007 Kang .................... B41J 2/1433
347/45
2013/0111753 A1* 5/2013 Nihei .................... B41J 2/1433
29/890.1

* cited by examiner

METHOD FOR MANUFACTURING LIQUID DISCHARGE HEAD

The present application is a continuation of U.S. patent application Ser. No. 14/553,978, filed on Nov. 25, 2014, which claims priority from Japanese Patent Applications No. 2013-248449 filed Nov. 29, 2013 and No. 2013-248450 filed Nov. 29, 2013, all of which are hereby incorporated by reference herein in their entirety.

BACKGROUND OF THE INVENTION

Field of the Invention

The present invention relates to a method for manufacturing a liquid discharge head.

Description of the Related Art

A liquid discharge head is used in a liquid discharge apparatus, such as an inkjet recording apparatus. The liquid discharge head includes a flow-passage forming member and a substrate. The flow-passage forming member is disposed on the substrate and may form discharge ports as well as liquid flow passages. The substrate has a liquid supply port. A liquid supplied from the liquid supply port into the liquid flow passages is discharged from the discharge ports onto a recording medium, such as paper.

As part of a method for manufacturing such a liquid discharge head, Japanese Patent Laid-Open No. 2006-137065 describes a method for forming a flow-passage forming member from a dry film transferred to a substrate. Before being transferred, the dry film is supported by a supporting member. After the dry film is transferred, the supporting member is peeled off the dry film. The flow-passage forming member is formed by leaving the dry film on the substrate and patterning the dry film using photolithography or the like.

SUMMARY OF THE INVENTION

A method for manufacturing a liquid discharge head according to an aspect of the present invention includes a transferring step of transferring a dry film supported by a supporting member to a substrate having a hole, and a peeling step of peeling the supporting member off the dry film on the substrate. In the peeling step, the dry film is in contact with a wall surface defining the hole in the substrate.

Further features of the present invention will become apparent from the following description of exemplary embodiments with reference to the attached drawings.

DESCRIPTION OF THE EMBODIMENTS

The substrate has a liquid supply port. To form the liquid supply port after the flow-passage forming member is formed on the substrate, it is necessary to protect the flow-passage forming member in the step of forming the liquid supply port. To avoid this, a hole to serve as the liquid supply port may be formed in the substrate before the flow-passage forming member is formed on the substrate.

However, studies done by the present inventors found that, in the step of peeling the supporting member off the dry film, the dry film was sometimes pulled toward the supporting member and deformed (damaged). In particular, there was a tendency for the dry film to deform above the hole, that is, above the opening of the hole in the surface of the substrate. When the flow-passage forming member is formed by the dry film, deformation of the dry film leads to deformation of the flow-passage forming member. This makes it difficult to manufacture a liquid discharge head having a good shape. The dry film may be used as a mold member for forming liquid flow passages. In this case, however, deformation of the dry film leads to deformation of the liquid flow passages. Again, this makes it difficult to manufacture a liquid discharge head having a good shape. The present invention provides a method for manufacturing a liquid discharge head having a good shape.

After a dry film supported by a supporting member is transferred to a substrate having a hole, the supporting member is peeled off the dry film. This method reduces deformation of the dry film caused by peeling off the supporting member.

Figure 1:
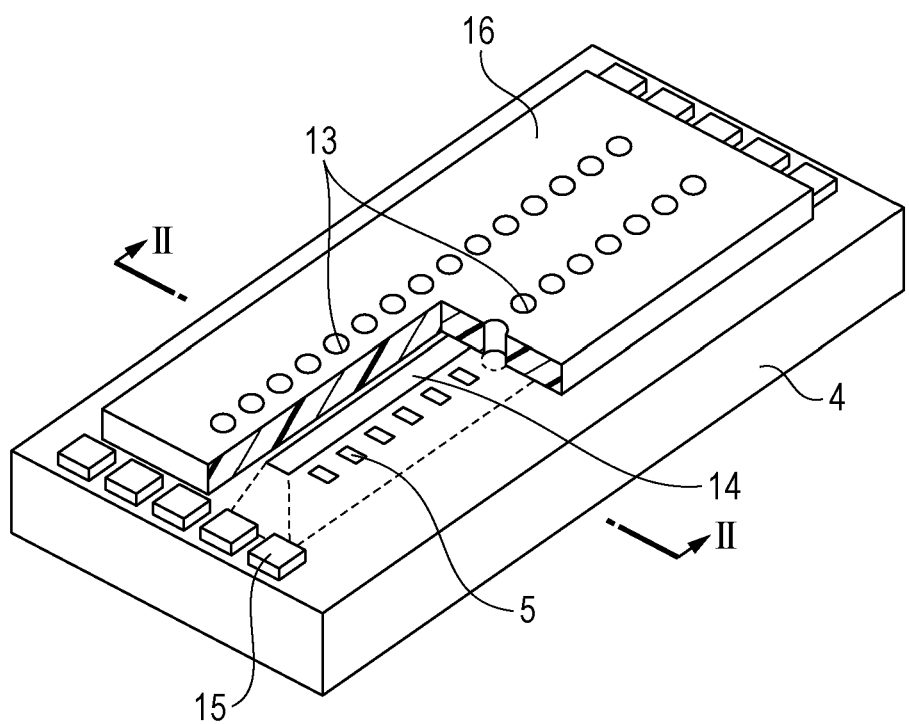
FIG. 1 illustrates a liquid discharge head manufactured in the present invention.

FIG. 1 illustrates a liquid discharge head manufactured according to an embodiment of the present invention. The liquid discharge head includes a substrate 4 and a flow-passage forming member 16. The substrate 4 is made of silicon or the like. A front (or upper as shown in FIG. 1) surface of the substrate 4 is defined as a first surface. Energy generating elements 5 are disposed on the first surface of the substrate 4. The first surface of the substrate 4 may be a surface with a crystal orientation of (100). In other words, the substrate 4 may be a silicon (100) substrate. Examples of the energy generating elements 5 include heating resistors and piezoelectric elements. The energy generating elements 5 may be fully in contact with the first surface of the substrate 4, or may each have a hollow therein to be partially in contact with the first surface of the substrate 4. Bumps 15 are also disposed on the first surface of the substrate 4. The energy generating elements 5 are driven by power supplied from outside the substrate 4 through the bumps 15. The substrate 4 has a hole 14 serving as a liquid supply port. The hole 14 passes through the substrate 4 from the first surface to a second surface which is opposite the first surface. A liquid supplied through the hole 14 receives energy from the driven energy generating elements 5 and is discharged from liquid discharge ports 13 in the flow-passage forming member 16.

A method for manufacturing a liquid discharge head according to the present invention will now be described. FIGS. 2A to 2G are cross-sectional views corresponding to line II-II in the liquid discharge head of FIG. 1.

Figure 2A:
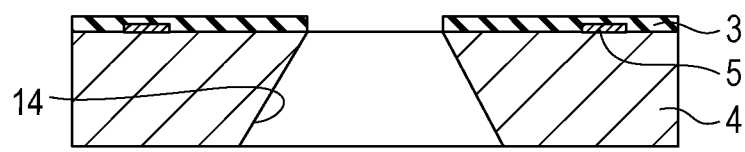
FIGS. 2A to 2G illustrate a method for manufacturing a liquid discharge head according to the present invention.

First, as illustrated in FIG. 2A, the substrate 4 having the energy generating elements 5 on the first surface is prepared. The energy generating elements 5 are covered with a protective film 3 made of SiN, SiO$_2$, or the like. The substrate 4 has the hole 14 open to the first surface. The hole 14 illustrated in FIGS. 2A to 2G is a liquid supply port. Although the hole 14 shown in FIG. 2A is a through hole passing through the substrate 4 from the first surface to the second surface, the hole 14 does not necessarily need to be a through hole. However, so as not to create an enclosed space in the process of manufacture, the hole 14 may be formed as a through hole. The hole 14 may be formed, for example, by laser processing, reactive ion etching, sandblasting, or wet etching. FIG. 2A shows an example in which the substrate 4 is a silicon (100) substrate and the hole 14 is formed by wet etching using tetramethylammonium hydroxide (TMAH). When the silicon (100) substrate is etched with an alkaline solution, such as a TMAH or potassium hydroxide (KOH) solution, a tapered hole, such as that illustrated in FIG. 2A, can be formed by anisotropic etching. With a tapered hole, it is possible to particularly effectively reduce deformation of a dry film in the step of peeling off a supporting member. The hole 14 may be a tapered hole whose cross section parallel to the first surface widens in the direction from the first surface to the second surface.

Figure 2B:

Next, as illustrated in FIG. 2B, a dry film 2 supported by a supporting member 1 is prepared. Examples of the supporting member 1 include a film, a glass member, and a silicon member. For convenience of peeling off the supporting member 1 in a later step, a film may be used as the supporting member 1. For example, a polyethylene terephthalate (PET) film, a polyimide film, a polyamide film, or a polyaramide film may be used as the supporting member 1. To facilitate peeling of the supporting member 1 off the dry film 2, mold release treatment may be applied to the surface of the supporting member 1.

The dry film 2 is obtained by shaping a resin into a film. The resin that forms the dry film 2 may be a photosensitive resin. The softening point of the resin may be from 40° C. to 120° C. The resin may be one that is readily dissolved in an organic solvent. Examples of such a resin include an epoxy resin, an acrylic resin, and a urethane resin. The epoxy resin may be a bisphenol A type epoxy resin, a cresol novolac epoxy resin, or an alicyclic epoxy resin. The acrylic resin may be polymethyl metacrylate. The urethane resin may be polyurethane. Examples of the solvent for dissolving these resins include propylene glycol methyl ether acetate (PGMEA), cyclohexanone, methyl ethyl ketone, and xylene. The viscosity of a resin composition obtained by dissolving a resin in such a solvent may be from 0.005 Pa·s to 0.15 Pa·s. The dry film 2 is formed on the supporting member 1 by applying the resin composition thereto using a spin coating or slit coating technique and drying the applied resin composition, for example, at 50° C. or more. After being dried, the dry film 2 on the supporting member 1 may be from 5 µm to 30 µm thick.

Figure 2C:
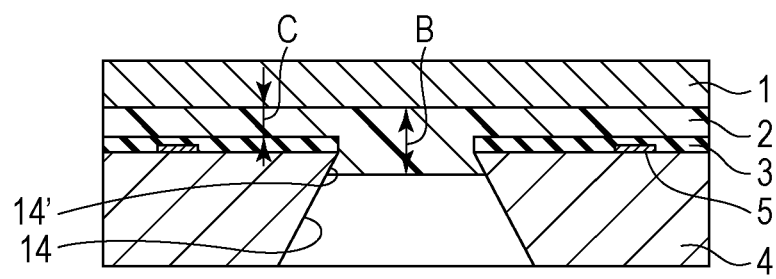

After the dry film 2 supported by the supporting member 1 is prepared, the dry film 2 is transferred to the substrate 4 having the hole 14 as illustrated in FIG. 2C. The hole 14 is closed by the transferred dry film 2. In other words, the dry film 2 becomes a lid for the hole 14. The dry film 2 is brought into contact with a wall surface 14' that defines the hole 14 in the substrate 4. To bring the dry film 2 into contact with the wall surface 14', for example, the dry film 2 may be heated while being in contact with the substrate 4. The heating temperature may be higher than the softening point of the dry film 2. Another method for bringing the dry film 2 into contact with the wall surface 14' may be to apply pressure to deform the dry film 2 in the direction of the substrate 4 while the dry film 2 is in contact with the substrate 4. For discharge of air bubbles, the application of pressure in the direction of the substrate 4 may be done by roll-type transfer or by transfer under vacuum. Heat and pressure may be simultaneously applied to the dry film 2.

With such a method, the dry film 2 is partially sunk into the hole 14 and brought into contact with the wall surface 14' as illustrated in FIG. 2C.

After the dry film 2 is contacted with the wall surface 14' (in other words once the dry film is in contact with the wall surface 14'), a peeling step of peeling the supporting member 1 off the dry film 2 is performed. As described above, the dry film 2 partially sinks in the hole 14 and is in contact with the wall surface 14'. Therefore, when the supporting member 1 is peeled off, the dry film 2 is caught and held in the hole 14 in the substrate 4. This makes the dry film 2 resistant to deformation.

When the dry film 2 is in contact with the wall surface 14', the dry film 2 is thicker in a region (B) including a portion sinking in the hole 14 (i.e., in the region (B) above the hole 14) than in other regions, such as a region (C) above the substrate 4 (in other words the dry film 2 is thicker in a region extending across the upper opening of the hole 14, and in particular extending across the narrowest portion of the upper opening hole, than in a region extending across the substrate 4). The dry film 2 is preferably from 5 µm to 30 µm thick in the region (B) above the hole 14. When the dry film 2 is 5 µm thick or more in the region (B), the dry film 2 can be suitably contacted with (in contact with) the wall surface 14'. This makes it possible to reduce deformation of the dry film 2 when the supporting member 1 is peeled off. More preferably, the dry film 2 is 10 µm thick or more in the region (B). In the dry film 2, the thickness of the region (C) above the substrate 4 becomes the height of flow passages. Therefore, the dry film 2 is preferably from 3 µm to 25 µm thick, and more preferably 20 µm thick or less in the region (C). The dry film 2 enters the hole 14 preferably by 2 µm or more, and more preferably by 5 µm or more, from the surface of the substrate 4. A length of a part which is in the hole of the dry film 2 is preferably 25 µm or less, and more preferably 20 µm or less. Note that the thicknesses and the lengths described here are those in the direction perpendicular to the surface of the substrate 4.

Figure 2D:
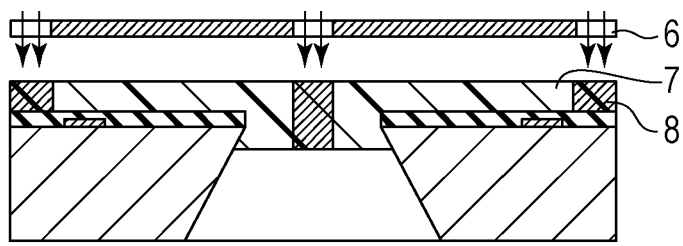

Next, a flow passage pattern is formed in the dry film 2. To ensure an accurate positional relationship between the liquid discharge ports 13 and the energy generating elements 5, the flow passage pattern may be formed by photolithography as illustrated in FIG. 2D. Here, the dry film 2 is irradiated with light through a mask 6 so as to form a flow passage pattern. An exposed region 8 and a non-exposed region 7 are formed in the dry film 2. When the dry film 2 is made of negative photosensitive resin, the exposed region 8 becomes part of the flow-passage forming member 16 and the non-exposed region 7 becomes part of liquid flow passages 10.

Figure 2E:
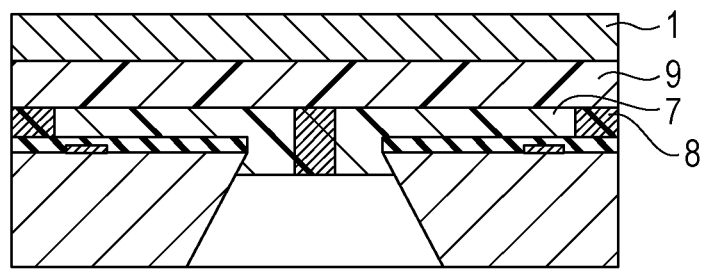

Next, as illustrated in FIG. 2E, a member 9 is formed on the dry film 2 having the flow passage pattern. FIG. 2E shows an example in which a second dry film different from the dry film 2 (hereinafter referred to as a first dry film) is used as the member 9. The second dry film is supported by the supporting member 1, which is peeled off after the second dry film is transferred onto the first dry film. The member 9 can alternatively be formed, for example, by applying a liquid resin composition onto the first dry film and drying it. The member 9 is formed on the first dry film by coating using a spin coating or slit coating technique, or by transfer using a lamination or press technique.

Figure 2F:
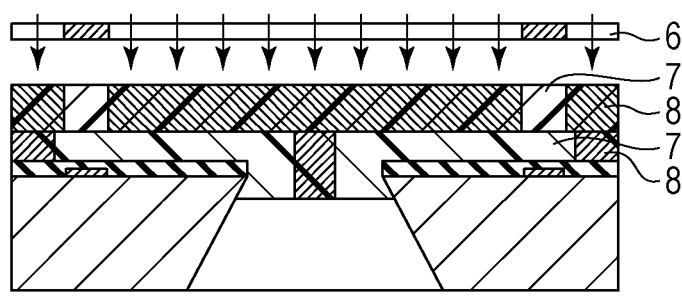

Next, as illustrated in FIG. 2F, a region for forming the liquid discharge ports 13 is formed in the member 9. When the member 9 is made of negative photosensitive resin, the member 9 is exposed to light through the mask 6 as illustrated in FIG. 2F. Alternatively, laser or reactive ion etching may be used to form the liquid discharge ports 13 in the member 9.

Figure 2G:
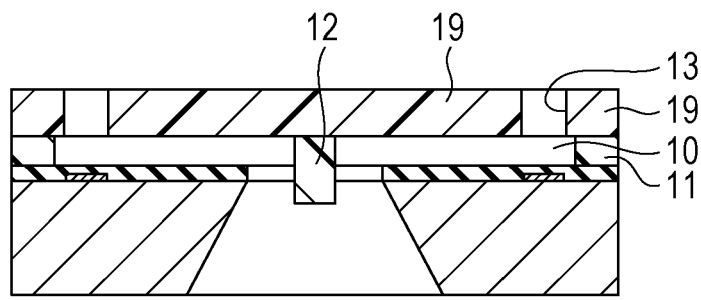

Next, as illustrated in FIG. 2G, development is performed by immersing the dry film 2 and the member 9 in a developing solution such that non-exposed regions 7 are removed. The liquid flow passages 10 and the liquid discharge ports 13 are thus obtained. Examples of the developing solution include PGMEA, tetrahydrofuran, cyclohexanone, methyl ethyl ketone, and xylene. The liquid flow passages 10 are defined by a member 11 formed by the dry film 2. The liquid discharge ports 13 are defined by a member 19 formed by the member 9. The member 11 and the member 19 form the flow-passage forming member 16 illustrated in FIG. 1. A wall 12 extends from the member 19 to the liquid flow passages 10. The wall 12 is formed by the dry film 2.

Last, electrical connections are made to form a liquid discharge head. The liquid discharge head manufactured in the present invention has a good shape with little deformation, because the dry film 2 forming the flow-passage forming member 16 is resistant to deformation. As illustrated in FIG. 2G, the wall 12 may extend out to the liquid flow passages 10. Specifically, the wall 12 can extend from the surface of the substrate 4 toward a liquid supply port by an amount by which the dry film 2 sinks into the hole 14.

The substrate 4 is exposed at the opening of the hole 14 serving as a liquid supply port. In this case, depending on the type of the liquid (ink) to be used, the substrate 4 exposed at the opening of the hole 14 gradually dissolves. As a result, the energy generating elements 5 on the substrate 4 may be eroded by contact with the liquid, or a circuit may be shorted. This can be reduced by sinking the dry film 2 into the hole 14 while leaving part of the dry film 2 in place.

Figure 4A:
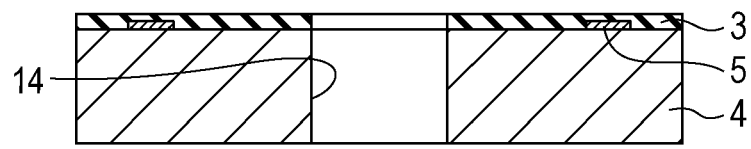
FIGS. 4A to 4H illustrate another method for manufacturing a liquid discharge head according to the present invention.
Figure 4B:
Figure 4C:
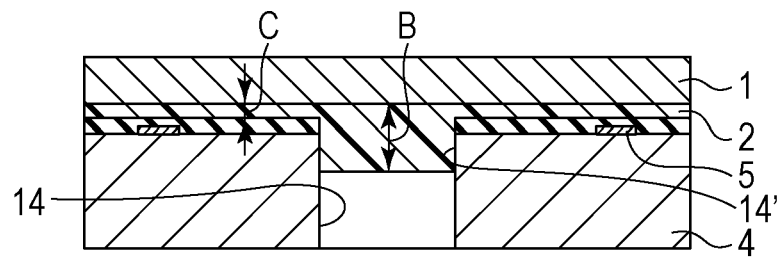
Figure 4D:
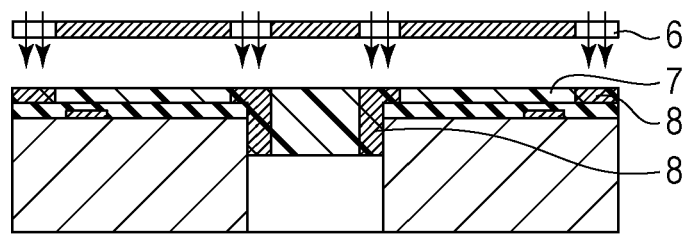

This will be explained with reference to FIGS. 4A to 4H. First, the steps in FIGS. 4A to 4C are performed in the same manner as in FIGS. 2A to 2C (so the description thereof will not be repeated). Next, the dry film 2 is patterned as illustrated in FIG. 4D. The patterning can be done by photolithography or dry etching. For better accuracy, the patterning may be preferably done by photolithography. FIG. 4D shows an example in which the dry film 2 is exposed to light by photolithography. The dry film 2 is irradiated with light through the mask 6 to form the exposed region 8 and the non-exposed region 7 in the dry film 2. This is done such that part of the dry film 2 covering the opening of the hole 14 is left. That is, when the dry film 2 is made of negative photosensitive resin, a part of the dry film 2 covering the opening of the hole 14 is made into the exposed region 8 as illustrated in FIG. 4D. The hole 14 is closed if the dry film 2 is fully exposed to light above the hole 14. Therefore, a part of the dry film 2 covering the edge of the opening is made into the exposed region 8 and the other region is made into the non-exposed region 7. Any other part of the dry film 2, other than that above the hole 14, may also be exposed to light as necessary. The dry film 2 is developed with a developing solution to remove the non-exposed region 7.

Figure 4E:
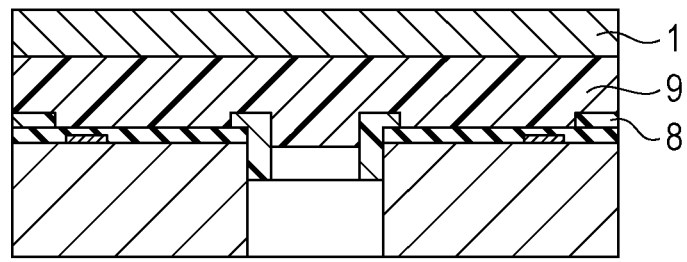

Next, as illustrated in FIG. 4E, the member 9 is formed on the remaining region of the dry film 2, that is, on the exposed region 8. FIG. 4E shows an example in which a second dry film different from the dry film 2 (hereinafter referred to as a first dry film) is used as the member 9. The second dry film is supported by the supporting member 1, which is peeled off after the second dry film is transferred onto the first dry film. The member 9 can alternatively be formed, for example, by applying a liquid resin composition onto the first dry film and drying it. The member 9 is formed on the first dry film by coating using a spin coating or slit coating technique, or by transfer using a lamination or press technique.

Figure 4F:
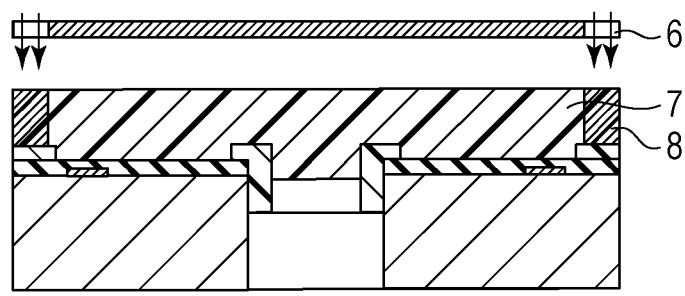

Next, as illustrated in FIG. 4F, the member 9 is patterned. For example, the exposed region 8 and the non-exposed region 7 are formed in the member 9 by photolithography using the mask 6. The first dry film and the second dry film have different sensitivities to light for exposure, and have different photosensitive wavelengths.

Figure 4G:
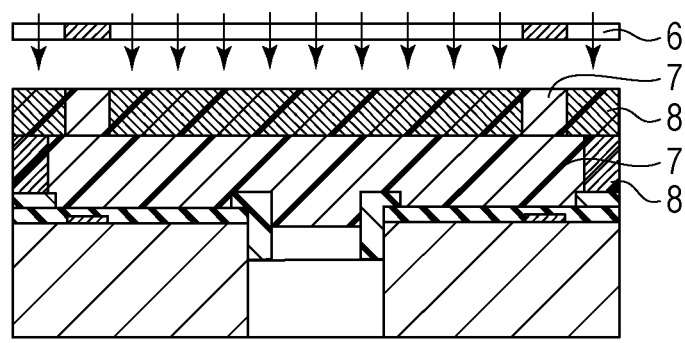

Next, as illustrated in FIG. 4G, a member for forming the liquid discharge ports 13 is formed, and a region for forming the liquid discharge ports 13 is formed in this member. When the member for forming the liquid discharge ports 13 is made of negative photosensitive resin, the member is exposed to light through the mask 6. Alternatively, laser or reactive ion etching may be used to form the liquid discharge ports 13.

Figure 4H:
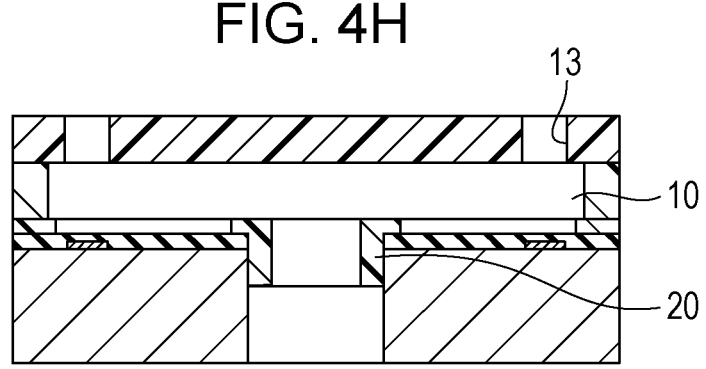

Next, as illustrated in FIG. 4H, development is performed by immersion in a developing solution. The liquid flow passages 10 and the liquid discharge ports 13 are thus obtained. Examples of the developing solution include PGMEA, tetrahydrofuran, cyclohexanone, methyl ethyl ketone, and xylene.

Last, electrical connections are made to form a liquid discharge head. In the liquid discharge head manufactured in the present invention, the substrate 4 is protected at the opening of the hole 14 by a protective film 20 formed by the dry film 2. The protective film 20 can be obtained by forming the dry film 2 into a film extending from the surface of the substrate 4 to the wall surface 14' that defines the hole 14. The protective film 20 thus protects the substrate 4 from liquid erosion. This makes it possible to provide a liquid discharge head having high reliability.

Figure 5A:
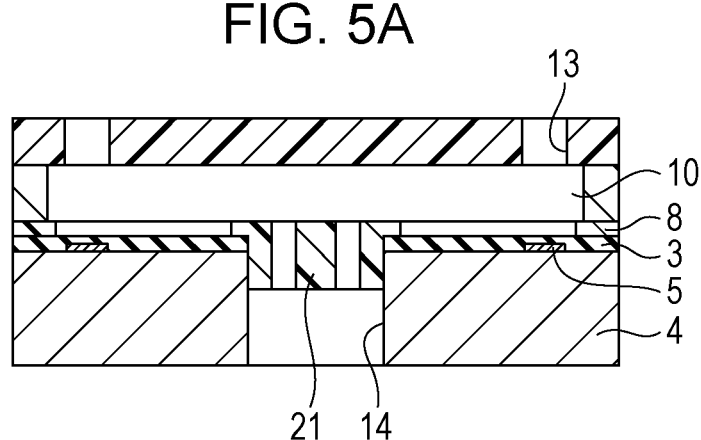
FIGS. 5A and 5B illustrate another liquid discharge head manufactured in the present invention.
Figure 5B:
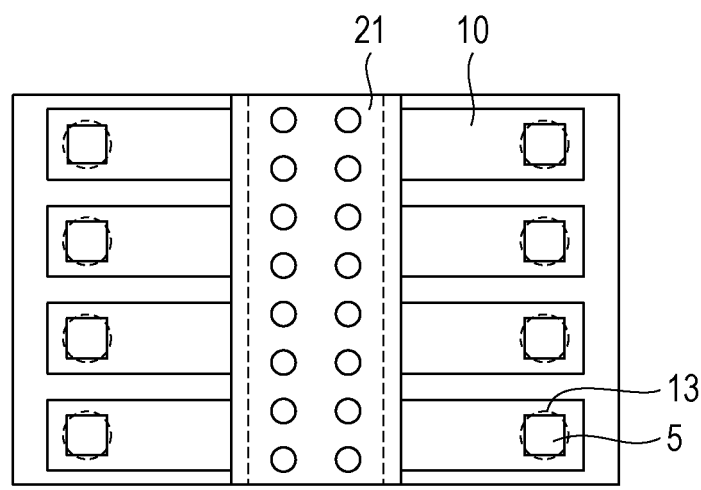

By patterning the dry film 2 illustrated in FIG. 4D, a filter 21 in FIGS. 5A and 5B can be obtained. FIG. 5A is a cross-sectional view of a liquid discharge head taken at the same position as FIGS. 4A to 4H. FIG. 5B is a top view of the liquid discharge head illustrated in FIG. 5A. The filter 21 protects the opening of the hole 14 to serve also as a protective film. The filter 21 can be formed by patterning the dry film 2 to leave a portion to serve both as a protective film and a filter.

EXAMPLES

Specific examples of embodiments of the present invention will now be given.

Example 1

First, as illustrated in FIG. 2A, the substrate 4 was prepared, which has the energy generating elements 5 made of TaSiN on the first surface. A silicon (100) substrate was used as the substrate 4. The substrate 4 has the protective film 3 made of SiN. The hole 14 to serve as a liquid supply port was formed in advance in the substrate 4 with 22% by mass of tetramethylammonium hydroxide (TMAH). The hole 14 formed was a tapered through hole.

Next, as illustrated in FIG. 2B, the supporting member 1 and the dry film 2 supported by the supporting member 1 were prepared. A PET film was used as the supporting member 1. The dry film 2 was formed by applying a solution obtained by dissolving an epoxy resin (product name: N-695, manufactured by DIC Corporation) and a photo-acid-generating agent (product name: CPI-210S, manufactured by San-Apro Ltd.) in PGMEA onto the PET film and drying it. The dry film 2 on the supporting member 1 was 6 µm thick after being dried.

Next, as illustrated in FIG. 2C, the dry film 2 was transferred to the substrate 4 having the hole 14. The transfer was done with a roll-type laminator (product name: VTM-200, manufactured by Takatori Corporation) under the conditions where the temperature of the dry film 2 was 120° C. and the magnitude of pressure applied in the direction of the substrate 4 was 0.4 MPa. After the transfer, the dry film 2 was 6 µm thick in the region (B) including a portion sinking in the hole 14, and 5 µm thick in the region (C) above the substrate 4. The dry film 2 was in contact with the wall surface 14'. In the direction perpendicular to the surface of the substrate 4, the dry film 2 entered the hole 14 by 1 µm from the surface of the substrate 4. With the dry film 2 being in contact with the wall surface 14', the supporting member 1 was peeled off the dry film 2 in an environment of 25° C.

Next, as illustrated in FIG. 2D, with the dry film 2 being in contact with the wall surface 14', the dry film 2 was exposed to 5000 J/m$^2$ light having an exposure wavelength of 365 nm through the mask 6 using an exposure device (product name: FPA-3000i5+, manufactured by CANON KABUSHIKI KAISHA). Then, baking was performed at 50° C. for five minutes to form a latent image on the dry film 2 such that the exposed region 8 in the dry film 2 became part of the flow-passage forming member 16 and the non-exposed region 7 in the dry film 2 became the liquid flow passages 10. The dry film 2 was exposed to light above the hole 14 so as to leave part of the dry film 2.

Next, as illustrated in FIG. 2E, the member 9 on the supporting member 1, which is a PET film, was transferred onto the dry film 2 with a roll-type laminator. A dry film (second dry film) was used as the member 9. The second dry film was formed by applying a coating liquid containing an epoxy resin (product name: 157S70, manufactured by Mitsubishi Chemical Corporation), a photo-acid-generating agent (product name: LW-S1, manufactured by San-Apro Ltd.), and a solvent (PGMEA) onto the PET film and drying it. The photosensitivity of the second dry film was different from that of the dry film 2 (first dry film), and was three or more times that of the first dry film.

Next, as illustrated in FIG. 2F, the second dry film was exposed to 1000 J/m$^2$ light having an exposure wavelength of 365 nm through the mask 6 using the exposure device (product name: FPA-3000i5+, manufactured by CANON KABUSHIKI KAISHA). Then, baking was performed at 90° C. for five minutes to form a latent image on the second dry film such that the exposed region 8 in the second dry film became a member for forming the liquid discharge ports 13 and the non-exposed region 7 in the second dry film became the liquid discharge ports 13.

Next, as illustrated in FIG. 2G, development was performed by immersing the dry film 2 and the member 9 in PGMEA serving as a developing solution. The liquid flow passages 10 and the liquid discharge ports 13 were thus obtained. The liquid flow passages 10 were defined by the member 11 formed by the dry film 2. The liquid discharge ports 13 were defined by the member 19 formed by the member 9. The wall 12 extended from the member 19 to the side of the hole 14. The wall 12, which is a wall of the liquid flow passages 10, was formed by a remaining portion of the dry film 2 above the hole 14. The member 11 and the member 19 formed the flow-passage forming member 16.

Last, electrical connections were made to form a liquid discharge head. In this liquid discharge head, an end portion of the wall 12 extended beyond (below) the surface of the substrate 4 to be located in the hole 14. No deformation of the liquid flow passages 10 was observed.

Example 2

A liquid discharge head was manufactured as illustrated in FIGS. 3A to 3E. First, the steps illustrated in FIGS. 2A to 2C were performed in basically the same manner as in Example 1. In Example 2, however, a dry film 17 made of positive photosensitive resin (product name: ODUR, manufactured by Tokyo Ohka Kogyo Co., Ltd.) was used, instead of the dry film 2 used in Example 1. The dry film 17 was 6 µm thick in a region including a portion sinking in the hole 14, and 5 µm thick in a region above the substrate 4. The dry film 17 was in contact with the wall surface 14'. In the direction perpendicular to the surface of the substrate 4, the dry film 17 entered the hole 14 by 1 µm from the surface of the substrate 4. With the dry film 17 being in contact with the wall surface 14', the supporting member 1 was peeled off the dry film 17 in an environment of 25° C.

Figure 3A:
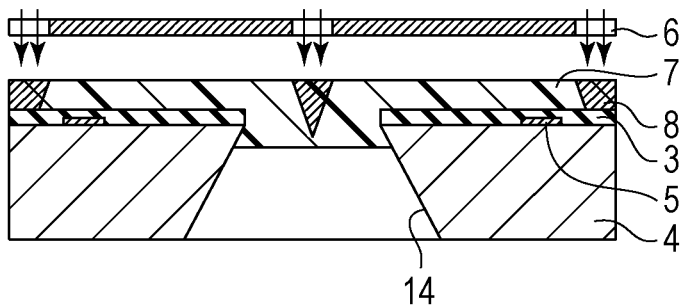
FIGS. 3A to 3E illustrate another method for manufacturing a liquid discharge head according to the present invention.

Next, as illustrated in FIG. 3A, the dry film 17 was exposed to 5000 J/m$^2$ light having an exposure wavelength of 365 nm through the mask 6 using an exposure device (product name: FPA-3000i5+, manufactured by CANON KABUSHIKI KAISHA).

Figure 3B:
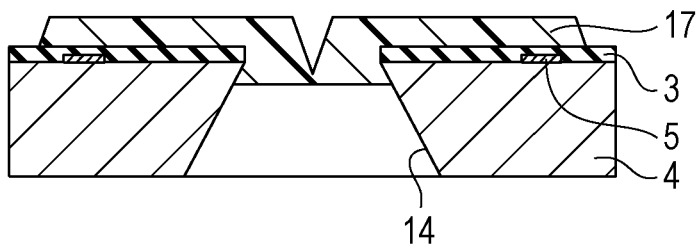

Next, as illustrated in FIG. 3B, with the dry film 17 being in contact with the wall surface 14', the dry film 17 was developed with methyl isobutyl ketone. Since the dry film 17 made of positive photosensitive resin was used, the exposed region 8 was removed by the development. The dry film 17 remaining after the patterning was used as a mold member for forming the liquid flow passages 10. The mold member was formed above the hole 14. A part of the mold member was removed to create a space.

Figure 3C:
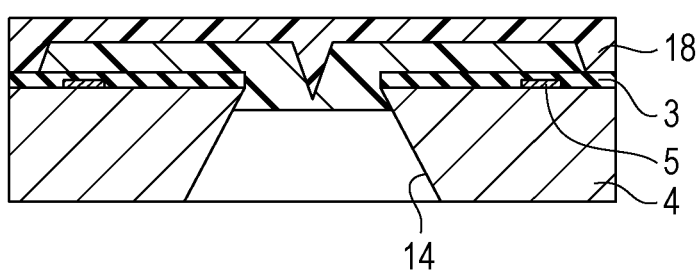

Next, as illustrated in FIG. 3C, a coating layer 18 was formed by an epoxy resin (product name: EHPE-3150, manufactured by Daicel Corporation) and a negative photosensitive resin containing xylene. The coating layer 18 was formed by spin coating to cover the dry film 17. The space created by removing part of the mold member was filled with the coating layer 18.

Figure 3D:
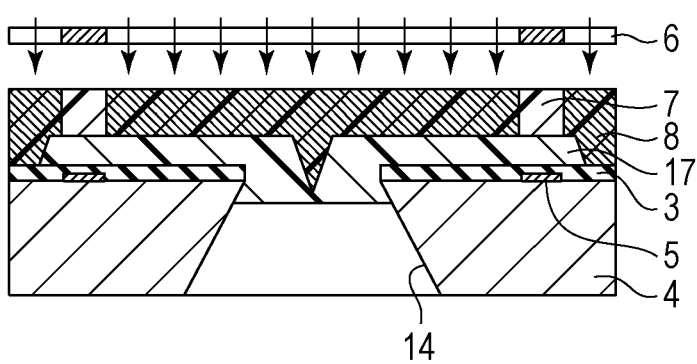

Next, as illustrated in FIG. 3D, the coating layer 18 was exposed to 4000 J/m$^2$ light having an exposure wavelength of 365 nm through the mask 6 using the exposure device (product name: FPA-3000i5+, manufactured by CANON KABUSHIKI KAISHA). Then, baking was performed at 90° C. for five minutes to form a latent image on the coating layer 18 such that the exposed region 8 in the coating layer 18 became a member for forming the liquid discharge ports 13 and the non-exposed region 7 in the coating layer 18 became the liquid discharge ports 13.

Figure 3E:
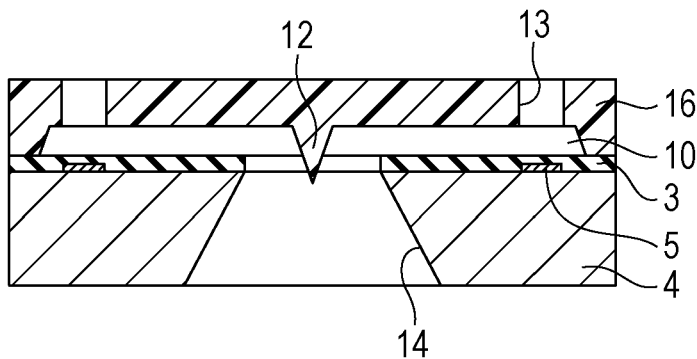

Next, as illustrated in FIG. 3E, the liquid discharge ports 13 were formed by paddle development of 60 seconds with a liquid mixture of methyl isobutyl ketone and xylene. Then, the liquid flow passages 10 were formed by immersion in methyl lactate for 60 seconds. The flow-passage forming member 16 was thus obtained. The wall 12 extended from the flow-passage forming member 16 to the hole 14. The wall 12, which is a wall of the liquid flow passages 10, was formed by a portion of the coating layer 18 filling the space created by removing a part of the dry film 17 above the hole 14.

Last, electrical connections were made to form a liquid discharge head. In this liquid discharge head, an end portion of the wall 12 extended beyond the surface of the substrate 4 to be located in the hole 14. No deformation of the liquid flow passages 10 was observed.

Example 3

First, as illustrated in FIG. 4A, the substrate 4 was prepared, which has the energy generating elements 5 made of TaSiN on the first surface. A silicon (100) substrate was used as the substrate 4. The substrate 4 has the protective film 3 made of SiN. The hole 14 to serve as a liquid supply port was formed in the substrate 4 with Reactive Ion Etching (RIE).

Next, as illustrated in FIG. 4B, the supporting member 1 and the dry film 2 supported by the supporting member 1 were prepared. A PET film was used as the supporting member 1. The dry film 2 was formed by applying a solution obtained by dissolving an epoxy resin (product name: N-695, manufactured by DIC Corporation) and a photo-acid-generating agent (product name: CPI-210S, manufactured by San-Apro Ltd.) in PGMEA onto the PET film and drying it in an oven at 100° C. The dry film 2 on the supporting member 1 was 20 μm thick after being dried.

Next, as illustrated in FIG. 4C, the dry film 2 was transferred to the substrate 4 having the hole 14. The transfer was done with a roll-type laminator (product name: VTM-200, manufactured by Takatori Corporation) under the conditions where the temperature of the dry film 2 was 120° C. and the magnitude of pressure applied in the direction of the substrate 4 was 0.4 MPa. After the transfer, the dry film 2 was 20 μm thick in the region (B) including a portion sinking in the hole 14, and 17 μm thick in the region (C) above the substrate 4. The dry film 2 was in contact with the wall surface 14'. In the direction perpendicular to the surface of the substrate 4, the dry film 2 entered the hole 14 by 3 μm from the surface of the substrate 4. With the dry film 2 being in contact with the wall surface 14', the supporting member 1 was peeled off the dry film 2 in an environment of 25° C.

Next, as illustrated in FIG. 4D, with the dry film 2 being in contact with the wall surface 14', the dry film 2 was exposed to 5000 J/m$^2$ light having an exposure wavelength of 365 nm through the mask 6 using an exposure device (product name: FPA-3000i5+, manufactured by CANON KABUSHIKI KAISHA). Then, baking was performed at 50° C. for five minutes. Thus, a portion covering the opening of the hole 14 becomes the exposed region 8. Then, development was performed with PGMEA to remove the non-exposed region 7.

Next, as illustrated in FIG. 4E, the member 9 was formed on the remaining region of the dry film 2, that is, on the exposed region 8 in this example. The member 9 was formed in the following manner. First, a solution obtained by dissolving an epoxy resin (product name: N-695, manufactured by DIC Corporation) and a photo-acid-generating agent (product name: CPI-210S, manufactured by San-Apro Ltd.) in PGMEA was applied onto a PET film. The applied solution was dried in an oven at 100° C. and transferred by lamination to the dry film 2 at a temperature of 120° C. and a pressure of 0.4 MPa. Then, the member 9 was obtained by peeling off the PET film. The member 9 was 5 μm thick.

Next, as illustrated in FIG. 4F, the member 9 was exposed to 5000 J/m$^2$ light having an exposure wavelength of 365 nm through the mask 6 using the exposure device (product name: FPA-3000i5+, manufactured by CANON KABUSHIKI KAISHA). The exposed region 8 and the non-exposed region 7 were formed in the member 9. Then, baking was performed at 50° C. for five minutes.

Next, in the same manner as that for the dry film 2 illustrated in FIG. 4B, a member for forming the liquid discharge ports 13 was produced. As illustrated in FIG. 4G, the resulting member was transferred to the member 9 with a roll-type laminator to form a region for forming the liquid discharge ports 13. The member for forming the liquid discharge ports 13 was produced by applying a solution obtained by dissolving an epoxy resin (product name: 157S70, manufactured by Mitsubishi Chemical Corporation) and a photo-acid-generating agent (product name: LW-S1, manufactured by San-Apro Ltd.) in PGMEA onto a PET film using a slit coating technique and drying the applied solution. The sensitivity of the dry film 2 was different from that of the member for forming the liquid discharge ports 13. The member for forming the liquid discharge ports 13 was exposed to 1000 J/m$^2$ light having an exposure wavelength of 365 nm through the mask 6 using the exposure device (product name: FPA-3000i5+, manufactured by CANON KABUSHIKI KAISHA). Then, baking was performed at 90° C. for five minutes to form a latent image for forming the liquid discharge ports 13.

Next, as illustrated in FIG. 4H, development was performed by immersion in PGMEA to form the liquid flow passages 10 and the liquid discharge ports 13.

Last, electrical connections were made to form a liquid discharge head. In this liquid discharge head, the substrate 4 was protected at the opening of the hole 14 by the protective film 20 formed by the dry film 2. No deformation of the liquid flow passages 10 was observed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A method for manufacturing a liquid discharge head, the method comprising:
    a putting step of putting, on a substrate having a hole, a dry film supported by a supporting member to close the hole, and
    a peeling step of peeling the supporting member off the dry film on the substrate,
    wherein the peeling step is performed in a state in which the dry film is in contact with a wall surface defining the hole in the substrate and in a state in which the dry film is embedded in a part of the hole.

2. The method according to claim 1, wherein in the putting step the dry film is brought into contact with the wall surface by applying pressure in the direction of the substrate while the dry film is in contact with the substrate.

3. The method according to claim 2, wherein the application of the pressure for the dry film is done by roll-type transfer or by transfer under vacuum.

4. The method according to claim 1, wherein in the putting step the dry film is heated while being in contact with the substrate.

5. The method according to claim 4, wherein a temperature for heating the dry film is higher than a softening point of the dry film.

6. The method according to claim 1, wherein when the dry film is in contact with the wall surface defining the hole in the substrate, a thickness of the dry film, in a direction perpendicular to a surface of the substrate, is greater above the hole than above the substrate.

7. The method according to claim 1, wherein in a direction perpendicular to a surface of the substrate, the dry film is from 5 μm to 30 μm thick above the hole.

8. The method according to claim 1, wherein in a direction perpendicular to a surface of the substrate, the dry film is from 3 μm to 25 μm thick above the substrate.

9. The method according to claim 1, wherein the dry film is made of a photosensitive resin.

10. The method according to claim 1, wherein the dry film forms a flow-passage forming member for forming liquid flow passages.

11. The method according to claim 1, wherein the dry film forms a mold member for forming liquid flow passages.

12. The method according to claim 1, wherein further processing is performed such that a part of the dry film is left above the hole, and a remaining part of the dry film forms a wall of liquid flow passages.

13. The method according to claim 1, wherein as a result of further processing the dry film is formed into a film extending from a surface of the substrate to the wall surface defining the hole.

14. The method according to claim 13, wherein by patterning the dry film after bringing the dry film into contact with the wall surface defining the hole in the substrate, the film extending from the surface of the substrate to the wall surface is obtained.

15. The method according to claim 13, wherein the dry film is supported by the supporting member before being putted to the surface of the substrate, and the supporting member is peeled off the dry film after the dry film is putted to the surface of the substrate.

16. The method according to claim 13, wherein the dry film forms a filter for the hole.

17. The method according to claim 1, wherein the length of a part of the dry film which is in the hole is 25 μm or less.

18. The method according to claim 1, wherein the length of a part of the dry film which is in the hole is 20 μm or less.

19. The method according to claim 1, wherein the length of a part of the dry film which is in the hole is 2 μm or more.

20. The method according to claim 1, wherein the hole extends in a direction perpendicular to a surface of the substrate on which the dry film supported by the supporting member is put.

* * * * *